US007399458B1

(12) United States Patent
Martin et al.

(10) Patent No.: US 7,399,458 B1
(45) Date of Patent: Jul. 15, 2008

(54) FIRED EQUIPMENT WITH CATALYTIC CONVERTER AND METHOD OF OPERATING SAME

(75) Inventors: Richard R. Martin, Tulsa, OK (US); Doyle C. Bishop, Tulsa, OK (US); Kurt E. Kraus, Tulsa, OK (US)

(73) Assignee: Callidus Technologies Inc., Tulsa, OK (US)

( * ) Notice: Subject to any disclaimer, the term of this patent is extended or adjusted under 35 U.S.C. 154(b) by 320 days.

(21) Appl. No.: 11/283,211

(22) Filed: Nov. 18, 2005

(51) Int. Cl.
*B01D 53/62* (2006.01)
*B01D 53/56* (2006.01)
*B01D 53/72* (2006.01)
*F23J 15/00* (2006.01)
*G05D 7/00* (2006.01)

(52) U.S. Cl. ............ 423/239.1; 423/245.3; 423/247; 423/DIG. 5; 422/105; 422/108; 422/110; 422/111; 422/168; 422/177; 422/180; 110/185; 110/203; 110/345

(58) Field of Classification Search ............ 423/239.1, 423/245.3, 247, DIG. 5; 422/105, 108, 110, 422/111, 168, 177, 180; 110/185, 203, 345
See application file for complete search history.

(56) References Cited

U.S. PATENT DOCUMENTS

| 3,887,683 | A | 6/1975 | Abe et al. |
| 4,299,734 | A | 11/1981 | Fujitani et al. |
| 5,073,105 | A | 12/1991 | Martin et al. |
| 6,007,325 | A | 12/1999 | Loftus et al. |
| 6,865,879 | B2 * | 3/2005 | Posselt et al. ............ 60/276 |

OTHER PUBLICATIONS

Derwent English abstract for U. S. Pat. 6,865,879 B2 patented on Mar. 15, 2005.*

* cited by examiner

*Primary Examiner*—Timothy C Vanoy
(74) *Attorney, Agent, or Firm*—McDonnell Boehnen Hulbert & Berghoff LLP

(57) ABSTRACT

A fired equipment system and process for operating same is provided that combines stationary industrial burner technology and a catalyst bed that converts pollutants formed during combustion of fuel and air in the burner to yield stack gases that need no further treatment before discharge to the atmosphere. The system and process disclosed reduces CO, NOx and VOC's by at least 90 to 95%.

16 Claims, 2 Drawing Sheets

FIRED EQUIPMENT WITH CATALYTIC CONVERTER AND METHOD OF OPERATING SAME

BACKGROUND OF THE INVENTION

1. Field of the Invention

Our invention relates to fired equipment systems that discharge environmentally friendly exhaust gases and methods of operating such systems. In particular, our invention includes a stationary industrial burner in combination with a catalyst bed that converts pollutants generated by the burner to exhaust gases that require no further treatment before discharge to the atmosphere.

2. The Prior Art

Industrial burners are designed to generate heat and produce high combustion temperatures, typically in the range of from 2500 to 3000° F. At such temperatures, thermal nitrogen oxides ($NO_x$) can form as gaseous byproducts of the combustion of air and the gas used as the fuel in the burners. These $NO_x$ byproducts, along with nitrogen oxides formed from the nitrogen containing compounds found in the fuel, are a major source of air pollution and governmental authorities have instituted strict environmental regulations limiting the amount of $NO_x$ gases that can be emitted into the atmosphere. Other pollutants generated by the combustion of fuel and air in the burner include carbon monoxide (CO) and volatile hydrocarbons (VOC's). Examples of such industrial burners are described in U.S. Pat. Nos. 5,073,105 and 6,007,325. To reduce or eliminate these nitrogen oxide pollutants the art has relied on selective catalytic reduction (SCR) of the flue gases exiting fired equipment. Unfortunately, SCR is designed to reduce primarily only the nitrogen oxide flue gas pollutants by injecting a reducing agent, such as, ammonia or urea, into the flue gas upstream of a catalyst bed to convert the NOx to nitrogen and water. Other pollutants may or may not be reduced from the flue gas. Urea is typically selected over ammonia in some applications because ammonia is poisonous and difficult to handle. Such systems are also complicated in that they require an assortment of different equipment and operating parameters to 1) inject the reducing agent(s) into the flue gas stream, 2) to mix the vaporized reducing agent and flue gas, 3) to allow sufficient residence time for the catalytic reaction, 4) to store the bulk reducing agent, and 5) to vaporize the reducing agent before injection. U.S. Pat. No. 3,887,683 describes such a SCR process to treat waste gases. Clearly a need exists for a simpler and more cost effective process to reduce pollutants generated by stationary fired equipment.

Our invention solves the problems currently associated with SCR processes by employing a process that does not require the injection of a reducing agent. Specifically, our invention utilizes a three-way catalyst composition, sometimes referred to as Non-selective Catalytic Reduction (NSCR). NSCR is best known for its use in treating exhaust in automobiles or other internal combustion engines and using catalyst compositions of the type described in U.S. Pat. No. 4,299,734. The use of our invention as described more fully below compared to traditional SCR processes results in lower capital cost for equipment, lower non-energy operating costs, lower energy costs, less physical area required for equipment and elimination of potential safety issues resulting from the use of ammonia. These and other benefits will become apparent from the following description, drawings and appended claims.

SUMMARY OF THE INVENTION

As stated, our invention is directed to providing an environmentally friendly stationary fired equipment system and methods of operating that system where the fired equipment has one or more burners in a combustion zone that is operatively connected to a catalyst bed that is capable of converting the pollutants generated during the burner combustion of fuel and air to inert and harmless gases. In particular, our invention converts nitrogen oxides (NOx), carbon monoxide (CO) and volatile hydrocarbons (VOC's) according to the following representative reactions.

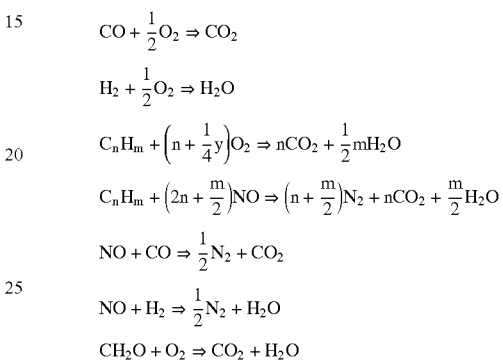

$$CO + \frac{1}{2}O_2 \Rightarrow CO_2$$

$$H_2 + \frac{1}{2}O_2 \Rightarrow H_2O$$

$$C_nH_m + \left(n + \frac{1}{4}y\right)O_2 \Rightarrow nCO_2 + \frac{1}{2}mH_2O$$

$$C_nH_m + \left(2n + \frac{m}{2}\right)NO \Rightarrow \left(n + \frac{m}{2}\right)N_2 + nCO_2 + \frac{m}{2}H_2O$$

$$NO + CO \Rightarrow \frac{1}{2}N_2 + CO_2$$

$$NO + H_2 \Rightarrow \frac{1}{2}N_2 + H_2O$$

$$CH_2O + O_2 \Rightarrow CO_2 + H_2O$$

These conversion reactions are obtained using a catalyst bed containing a solid catalyst comprising a high surface area support. The support contains various metals to perform the above reactions at temperatures ranging from about 400° F. to about 1,500° F. and most preferably in the range from about 750° F. to about 1,250° F. In particular, our invention includes a fired equipment system, comprising, in combination, at least one stationary industrial burner; a combustion zone (with or without heat transfer); at least one catalyst bed that can process the burner effluent from the combustion zone whereby the pollutants, such as, NOx, CO and VOC's, present in the burner effluent are reduced in quantity by exposure to the catalyst bed to environmentally acceptable levels.

In alternative embodiment our invention comprises, in combination, at least one stationary industrial burner; a combustion zone; a radiant heat transfer section associated with the burner; at least one convection heat transfer section associated with the radiant heat transfer section that is capable of heating a process fluid using known heat exchange equipment; at least one catalyst bed that can process the burner effluent from the convection heat transfer section whereby the pollutants, such as, NOx, CO and VOC's, present in the burner effluent are reduced in quantity by exposure to the catalyst bed to environmentally acceptable levels. An alternative process of our invention employs a second convection heat transfer section downstream of the catalyst bed whereby the effluent from the catalyst bed is used to heat a second process stream using known heat transfer methods. At least one gas composition analyzer can be operatively connected to the system to monitor the gas compositions in the effluent from the combustion zone or convection section, and/or the gases entering and/or exiting the catalyst bed, and/or to provide information to a process controller that controls fuel and/or air flows to the system. The gas composition analyzer can also monitor the level of conversion or reduction of the pollutants near the stack exit to determine the composition of the gas exiting our process. In particular the process controller is used to control the quantity of fuel and air to the burner and alternatively the quantity of a reactant injected upstream of the catalyst bed. This reactant stream can be a fuel or air stream or a combination of two streams, i.e. one fuel and one air.

In addition to the particular selection and arrangement of equipment, our invention also involves methods of reducing or removing pollutants, including carbon monoxide, nitrogen oxides and hydrocarbons, from the effluent of stationary fired equipment comprising, in combination, providing one or more stationary industrial fired burners in a combustion chamber; generating an effluent in the combustion chamber by combusting a mixture of air and fuel in the burner, where the effluent contains pollutants selected from the group consisting of nitrogen oxides, carbon monoxide, hydrocarbons and mixtures thereof; directing the effluent to a catalyst bed whereby a catalytic reaction occurs that reduces the amount of pollutants in the effluent; sampling the catalyzed effluent to determine the reduction of the pollutants and for CO and $O_2$ concentrations; and removing the catalyzed effluent from the fired equipment through an exhaust duct.

BEST MODES FOR CARRYING OUT THE INVENTION

Figure 1:
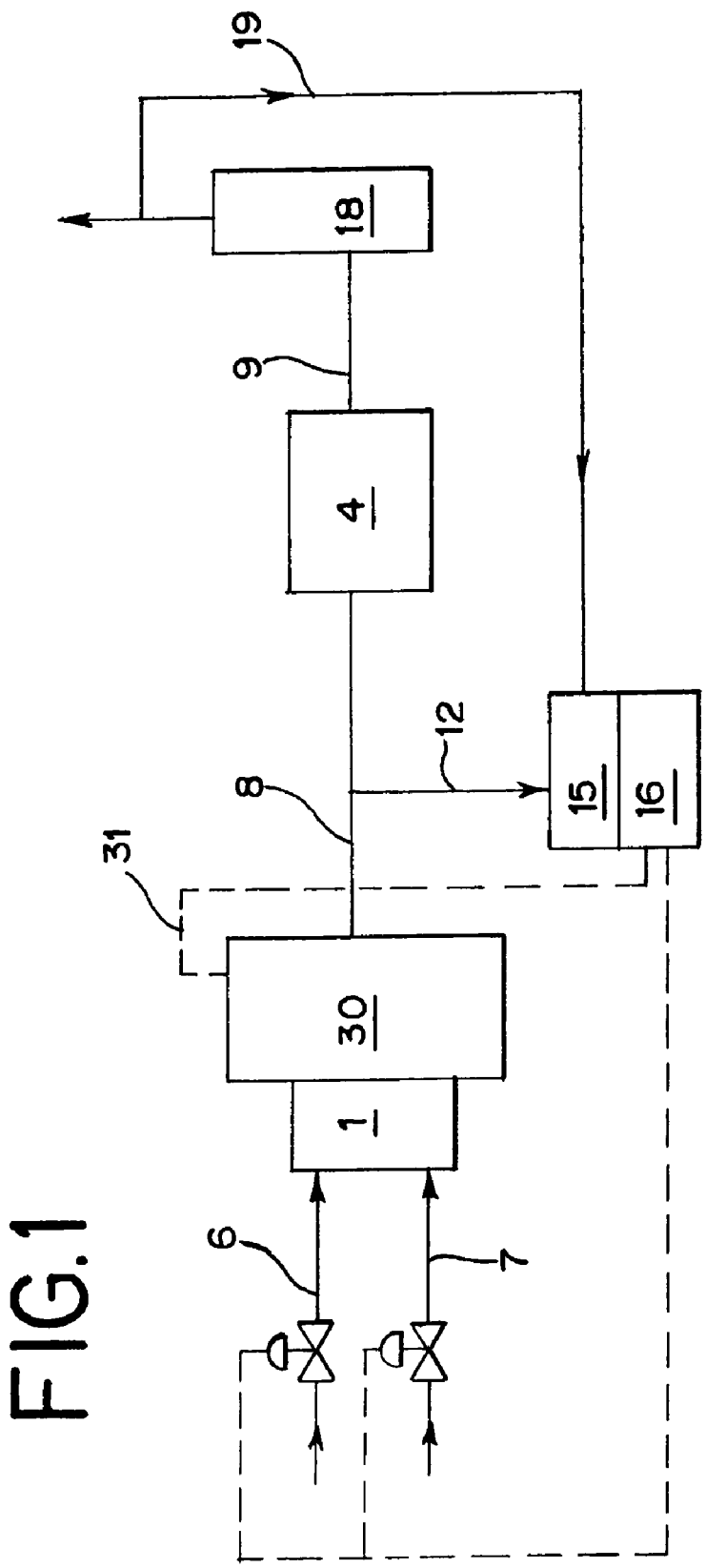
FIG. 1 is a block diagram of one embodiment of the equipment and process flow of our invention.

While our invention is susceptible of embodiment in many different forms, there is shown in the drawings and will be described below in detail, some of the specific embodiments possible, with the understanding that the present disclosure is to be considered an exemplification of the principles of the invention and is not intended to limit our invention to the embodiment illustrated.

While the burner of the invention shown in the drawings and discussed below is schematically positioned horizontally in the enclosed structure, as if mounted in a wall of a furnace, it should be understood that one or more burners of the present invention may also be installed in a floor or roof of any structure requiring heating with suitable modification which would be readily apparent to one of ordinary skill in the art having the present disclosure before them, without departing from the principles of the invention. In addition, although the furnaces of the present invention are discussed with respect to natural ("thermal") draft furnaces, it is to be understood that forced draft burners and/or induced draft burners are also intended to be encompassed by the principles of the invention described herein, with suitable modifications which would be readily apparent to one of ordinary skill in the art having the present disclosure before them. Although the term "air" is used through out this application, the meaning should not be limited to mean only ambient air, but instead should be construed to include any gas stream containing $O_2$.

Figure 2:
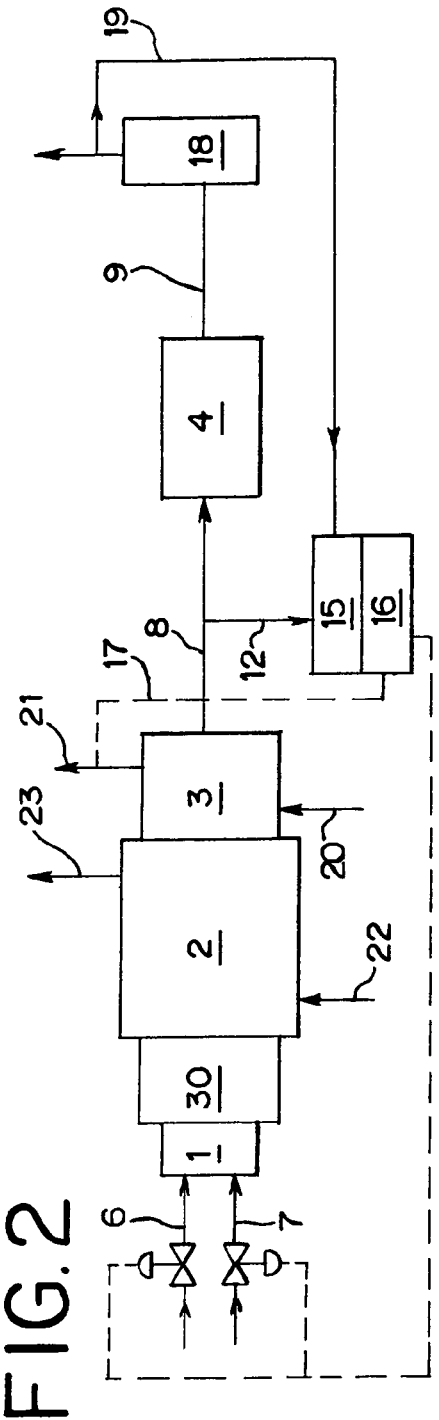
FIG. 2 is a block diagram of a first alternative embodiment of the equipment and process flow of our invention.
Figure 3:
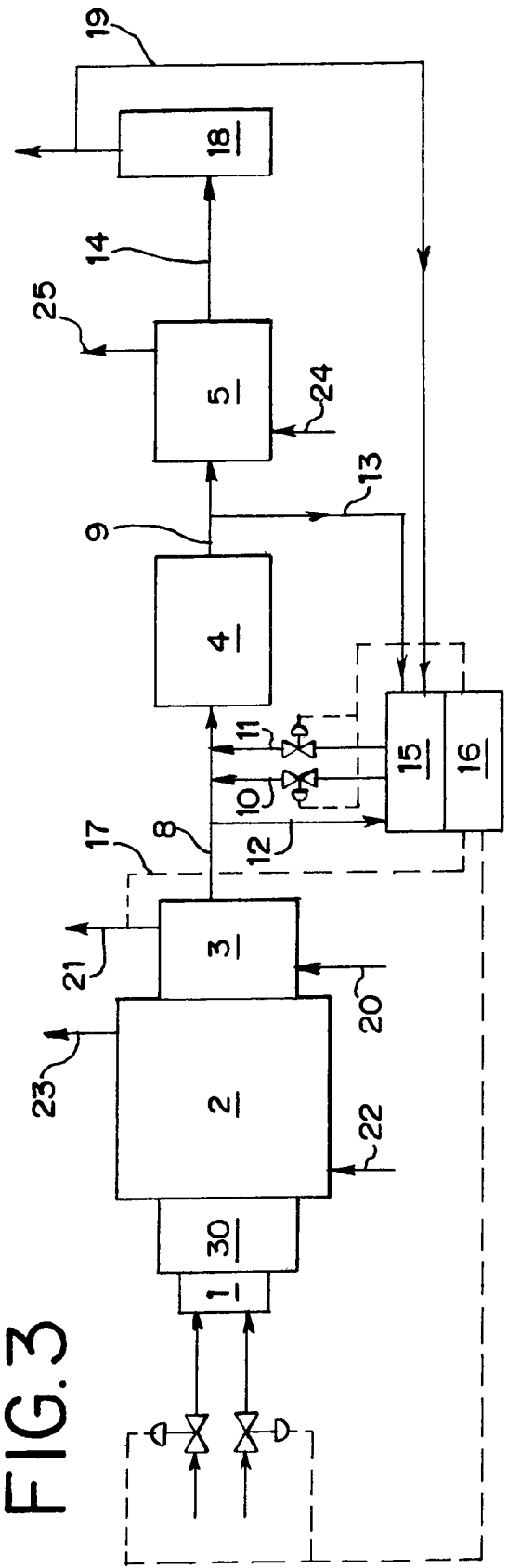
FIG. 3 is a block diagram of a second alternative embodiment of the equipment and process flow of our invention.

FIGS. 1, 2 and 3 illustrate schematically process flow schemes and associated equipment of preferred embodiments of our invention. For clarity purposes, detailed parts of the equipment, such as individual valves, gauges, and other connectors not directly involved in the invention are not shown in the drawings in order to focus on the equipment and process flow that is required to describe the invention.

Turning first to FIG. 1, our system includes at least one burner 1, a combustion zone 30 associated with the burner, a catalyst bed 4 and a stack 18 to vent the catalysized effluent. Burner 1 can be any industrial burner that is fired by a mixture of air and fuel, where the fuel can comprise any combustible liquid, solid or gas, for example, natural gas, liquid hydrocarbons or coal. Burners typically are mounted in the walls, roofs or floors of fired equipment and are characterized by an open flame design that provides direct heat to the material that requires heating, either through radiant heat transfer or convection heat transfer or both. Multiple burners are usually employed within the various fired equipment designs, with the size and number of the burners dictated by the material or process fluid that requires heating. The combustion zone can be any chamber where the heat and effluent gases from the burner are initially directed after combustion. In some cases the heat and gases are directed to a radiant heat transfer section as discussed in more detail below. In other situations, the heat from the combustion in the burner is used directly to heat or dry a substance. In this latter circumstance, the combustion zone can be part of a direct or indirect dryer, such as a rotary, continuous, tunnel or tray dryer, or a fluidized bed, calciner, furnace or kiln. The design of such devices is well known to those skilled in the art. Burner 1 is controlled by monitoring via signal 31 the temperature of the chamber and/or the material being heated in the chamber and providing that temperature signal to process controller 16. Inlet fuel 6 to the burner is increased or decreased by the process controller depending on the desired temperature of the material being heated as monitored via signal 31. Alternatively, fuel control to the burner could be controlled as a function of the (1) temperature of the process flow, (2) the temperature of the combustion product flow, (3) the process flow (steam flow for boilers) or (4) other measured parameters that produces the desired process effect. The effluent 8 from the combustion zone is sent to catalyst bed 4, and eventually to exhaust stack 18. This combination of a burner and a combustion zone is only one type of design for the fired equipment. It is also possible to include with the process shown in FIG. 1 a convection heat transfer section associated with the combustion to extract heat generated by the burner. Alternative fired equipment designs, as discussed below, include a burner section, a radiant heat transfer section and at least one convection section. The radiant and convection heat transfer sections can use indirect heat transfer equipment, for example a process fluid in a pipe, tube or other conduit, to remove heat from the combustion zone effluent.

For clarity, FIG. 1 illustrates a single burner, however, as mentioned; our invention is equally applicable to fired equipment with multiple burners. Fuel and air are supplied to burner 1 by lines 6 and 7, respectively, where they are joined and combusted in the burner to produce an effluent 8 containing pollutants that passes through combustion zone 30 and heat whatever material that the process is designed to heat. The amount of fuel 6 supplied to burner 1 is controlled by process controller 16, which receives a temperature input 31, where the degree of heating and resultant desired temperature of the process stream being heated by the system will determine the amount of fuel sent to the burner by the process controller. Higher temperature requirements for the material being heated means more fuel is supplied to the burner. For informational purposes, the temperature of effluent 8 as it exits combustion zone 30 can be monitored with known monitoring equipment and methods.

Although shown as only a single process controller 16, our invention could use multiple controllers with varying designs and mechanical configurations. Because fuel and air are being combusted in the burner the effluent 8 generated will necessarily contain pollutants, including non-combusted hydrocarbons (VOC's), CO and NOx. These pollutants must be eliminated or significantly reduced in concentration before the effluent gas is ultimately discharged to the atmosphere. Our invention converts a significant portion of these pollutants to inert materials before discharge through exhaust stack 18. To achieve this reduction of the pollutants in the effluent the gases are directed to the inlet of catalyst bed 4.

In order that the catalyst in catalyst bed 4 is effective in reducing or converting the pollutants it is desired to have an inlet gas temperature of the effluent in the range from about 400° F. to about 1500° F. and most preferably from about 750° F. to about 1250° F. In addition, it is important to control the oxygen content of the gas stream entering or exiting the catalyst bed using process controller 16. Preferably the effluent entering the catalyst bed should have an oxygen content of 0.5 mole % or less. In the process shown in FIG. 1, the CO content is measured in effluent 8 via line 12 by gas composition analyzer 15 and a signal is sent to process controller 16, which in turn controls the air flow provided to the burner via line 7. Typically, the controller controls the opening and closing of an air damper associated with the burner, shown schematically as a simple control valve in the drawings. Although gas composition analyzer 15 is shown as a stand alone device, our process could employ a number of analyzers, which the design of are known to the art of analyzing gas streams, including in-situ analyzers that do not require a sample line or sample port and that operate by continuously or periodically monitoring the flowing gas. The CO, NOx and $O_2$ are sampled at stack 18 via line 19 to evaluate the performance of the process.

The catalyst composition used in catalyst bed 4 can be any combination of active metals on a support that is capable of reducing or converting nitrogen oxides, carbon monoxide and hydrocarbons to inert compounds such as carbon dioxide, water and nitrogen. A preferred catalyst is the type typically used to remove noxious components found in the exhaust of internal combustion engines. Such a catalyst is disclosed in U.S. Pat. No. 4,299,734, which teachings are incorporated herein by reference. Most preferred would be a monolithic catalyst comprising a porous support made from zirconia, alumina or combinations of these. Alternatively, the catalyst could also comprise one or more coiled metal foils having a porous wash coat to support one or more active metals used to catalyze the reduction of $NO_x$, CO and VOC's. The carrier could also contain at least one oxide selected from the group consisting of cerium oxide, manganese oxide and iron oxide. The porous support would also be impregnated with at least one active metal as the catalytic site. The specific metal or combination of metals is not critical to our invention, provided that the resultant finished catalyst composition achieves the desired level of environmentally acceptable reduction of pollutants. Preferred catalyst metals include those selected from the group consisting of platinum, palladium and mixtures thereof. After passing through the catalyst bed a catalyst effluent 9 is formed, which is eventually directed to stack 18 where a sample of the exhaust gasses 19 is sent to analyzer 15 for analysis of CO, VOC, $O_2$ and $NO_x$ to monitor and ensure all air quality regulations are met. In most circumstances the exhaust gas should have less than 200 ppm CO, and more preferably less than 50 ppm. $NO_x$ levels of about 10 to 15 ppm are desired, more preferably less than about 5 ppm. In general, the goal of our invention is to reduce the total amount of CO, $NO_x$ and VOC's by at least 90% to 95%.

Turning next to FIG. 2, which represents a more complicated process of our system that includes at least one burner 1, a combustion zone 30, a radiant heat transfer section 2, a convection heat transfer section 3, a catalyst bed 4, and a exhaust stack 18. In this embodiment, a portion of the heat generated by the burner is removed by process streams 22 and 23 using well known heat exchange equipment and operating parameters. Likewise, process streams 20 and 21 also remove a portion of the heat from the gas effluent generated by the burner as it flows through convection heat transfer section 3. Fuel and air are supplied to burner 1 by lines 6 and 7, respectively, where they are joined and combusted in the burner to produce an effluent 8 containing pollutants that passes through radiant heat transfer section 2 and convection heat transfer section 3. The amount of fuel supplied to burner 1 is controlled by process controller 16, which receives a temperature input 17 of one or more process streams being heat exchanged indirectly in the radiant and convection heat transfer sections, i.e. streams 23 and 21. The degree of heating and resultant desired temperature of the process stream being heated by the system will determine the amount of fuel sent to the burner by the process controller. Higher temperature requirements for the process stream mean more fuel is supplied to the burner. For informational purposes, the temperature of effluent 8 as it exits convention heat transfer section 3 can be monitored with known monitoring equipment and methods.

FIG. 3 shows an alternate process embodiment of our invention. Where the item numbers used in FIGS. 2 and 3 are the same as used in FIG. 1 the same meaning applies. This alternative process adds a second convection heat transfer section 5 for improved efficiency downstream of the catalyst bed in order to recover a portion of the heat from catalyst effluent 9 using known heat exchange means with process streams 24 and 25. This embodiment also provides for analysis of the $O_2$ content in catalyst effluent 9 and control of the inlet $O_2$ content by injection of fuel through line 10 or air through line 11, which are both controlled by process controller 16. If the oxygen level of the effluent entering the catalyst bed is higher than desired, then fuel can be injected to reduce the percent oxygen. Likewise, if the oxygen is too low, then air can be injected to increase the percentage $O_2$. Of course, the oxygen content of the gas entering the catalyst bed could also be controlled by sampling the gas downstream of air injection 11. Such a sample would be processed in analyzer 15 which can then communicate with process controller 16 that in turn would control either the fuel or air injection, lines 10 & 11, respectively to maintain the oxygen content of 0.5 mole % or less. To determine the level of conversion of the pollutants across catalyst bed 4 a sample of catalyst effluent 9 can be removed by line 13 and analyzed in analyzer 15 for VOC, CO, $O_2$ and $NO_x$ content.

Although several operating control schemes are shown in FIGS. 1, 2 and 3, our invention could be controlled by a number of possible control schemes. For example, the most basic control scheme would involve the measurement and control of CO of the effluent exiting the first convection section along with measurement of $NO_x$, CO and $O_2$ exiting the stack. Process fluid outlet temperature would control the fuel to the burner. A more complicated scheme would add temperature measurements of the combustion gases at the exit of the first convection section and at the exit of the catalyst chamber. A still further more complicated scheme would add $O_2$ measurement and control at either the inlet or exit of the catalyst bed and an air control valve for air injection upstream of the catalyst bed. Alternatively, instead of the air control valve, a fuel control valve could be used. And finally, a still further control scheme would have both an air control valve and a fuel control valve for air and fuel injection upstream of the catalyst bed.

Although we have shown a preferred embodiment of the system of our invention, our method of removing pollutants created during burner use in fired equipment could comprise a variety of configurations and process conditions that utilize the catalyst described herein. Use of the present invention, and the attendant process for treating burner effluents which are provided by it, thus results in numerous advantages, many of which are mentioned above. It will be understood that our invention may be embodied in other specific forms without departing from its spirit or central characteristics. The above-mentioned embodiments and figure, therefore, are to be considered in all respects as illustrative and not restrictive, and the invention is not to be limited to the details given here.

We claim:

1. A fired equipment system, comprising, in combination, the following:
   a) a stationary industrial burner;
   b) a combustion zone associated with the burner, where the combustion zone includes integrated heat transfer equipment;
   c) a catalyst bed having an inlet and an outlet for reducing in quantity NOx, CO and hydrocarbons generated during combustion of fuel and air in the burner;
   d) an exhaust stack for removal of gas exiting the outlet of the catalyst bed;
   e) a gas composition analyzer operatively connected to the fired equipment system; and
   f) a process controller operatively connected to the fired equipment system.

2. A fired equipment system, comprising, in combination, the following:
   a) a stationary industrial burner;
   b) a radiant section associated with the burner with integrated first heat transfer equipment;
   c) a convection section associated with the radiant section with integrated second heat transfer equipment;
   d) a catalyst bed having an inlet and an outlet for reducing in quantity NOx, CO and hydrocarbons generated during combustion of fuel and air in the burner;
   e) an exhaust stack for removal of gas exiting the outlet of the catalyst bed;
   f) a gas composition analyzer operatively connected to the fired equipment system; and
   g) a process controller operatively connected to the fired equipment system.

3. The system of claims 1 or 2 wherein the catalyst bed comprises a catalyst having a carrier containing metals selected from the group consisting of platinum, palladium, rhodium and mixtures thereof.

4. The system of claims 1 or 2 where the catalyst bed comprises one or more monolithic supports having a porous wash coat to support the metal catalyst.

5. The system of claims 1 or 2 where the catalyst bed comprises one or more coiled metal foils having a porous wash coat to support the metals.

6. A fired equipment system, comprising, in combination, the following:
   a) a stationary industrial burner;
   b) a radiant section associated with the burner with integrated first heat transfer equipment;
   c) a first convection section associated with the radiant section with integrated second heat transfer equipment;
   d) a catalyst bed having an inlet and an outlet for reducing in quantity NOx, CO and hydrocarbons generated during combustion of fuel and air in the burner;
   e) a second convection section downstream of the catalyst bed with integrated third heat transfer equipment;
   f) a gas composition analyzer operatively connected to either the inlet or outlet of the catalyst bed;
   g) a process controller operatively connected to the gas composition analyzer;
   h) reactant injection inlet upstream the catalyst bed; and
   i) reactant supply valve associated with the injection inlet and operatively connected and controlled by the processor controller.

7. The system of claim 6 wherein the catalyst bed comprises a catalyst having a carrier containing metals selected from the group consisting of platinum, palladium, rhodium and mixtures thereof.

8. The system of claim 7 where the catalyst bed comprises one or more monolithic supports having a porous wash coat to support the metal catalyst.

9. The system of claim 7 where the catalyst bed comprises one or more coiled metal foils having a porous wash coat to support the metals.

10. A method of removing pollutants including carbon monoxide, nitrogen oxides and hydrocarbons from the effluent of stationary fired equipment comprising, in combination, the following:
    a) providing one or more stationary industrial fired burners in a combustion chamber;
    b) generating an effluent in the combustion chamber by combusting a mixture of air and fuel in the burner, where the effluent contains pollutants selected from the group consisting of nitrogen oxides, carbon monoxide, hydrocarbons and mixtures thereof;
    c) directing the effluent to a catalyst bed whereby a catalytic reaction occurs that reduces in quantity the amount of pollutants in the effluent;
    d) sampling the catalyzed effluent for CO and O2 concentration; and
    e) removing the catalyzed effluent from the fired equipment through an exhaust duct.

11. The process of claim 10 further comprising maintaining the oxygen content of the effluent directed to the catalyst bed to a concentration in the range from about 0.3% to 1.0%.

12. The process of claim 10 further comprising removing heat generated by the burner by heat exchange with a process fluid.

13. The process of claim 12 further comprising using a process controller to,
    a) monitor the temperature of the heat exchanged process fluid in order to control fuel flow to the burner;
    b) monitor the CO content of the effluent prior to introduction into the catalyst bed in order to control the air flow to the burner; and
    c) monitor the oxygen content of the catalyzed effluent in order to control injection of a reactant upstream of the catalyst bed to maintain a pre-determined oxygen concentration in the effluent entering the catalyst bed.

14. The process of claim 13 further comprising removing heat from the effluent in a first convention zone by heat exchange with a first process fluid to maintain a temperature of the effluent introduced to the catalyst bed between 400° F. and 1,500° F.

15. The process of claim 14 further comprising directing the catalyzed effluent to a second convection zone and removing heat from the catalyzed effluent by heat exchange with a second process fluid to maintain a temperature of the catalyzed effluent below 750° F.

16. The process of claim 15 further comprising directing the catalyzed effluent directly into the atmosphere without further treatment.

* * * * *